United States Patent Office 3,106,591
Patented Oct. 8, 1963

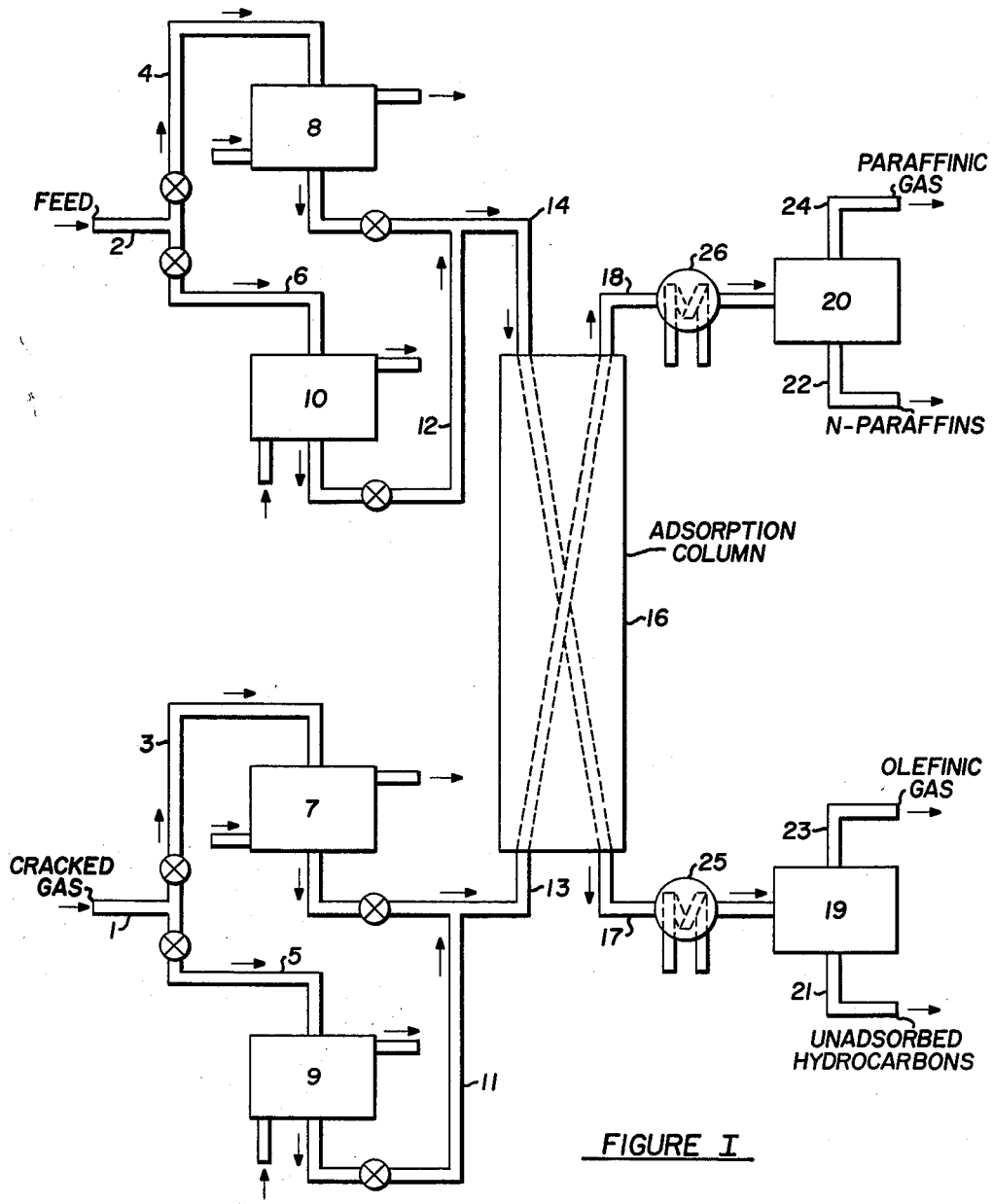
FIGURE I

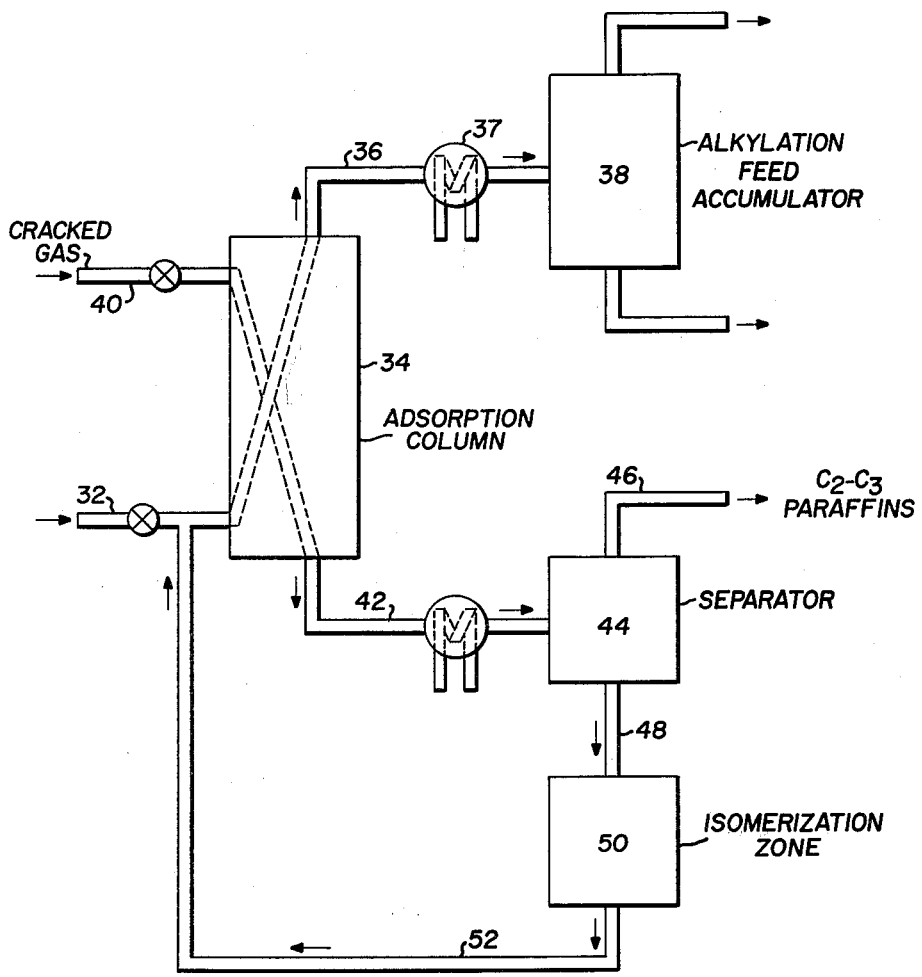
FIGURE II

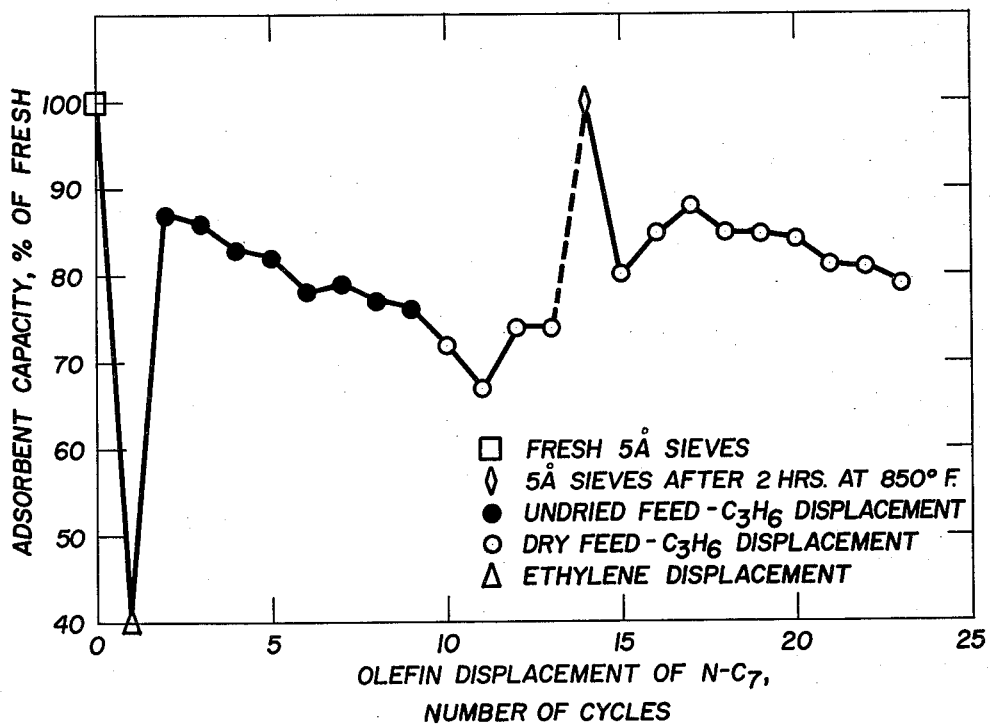

3,106,591
HYDROCARBON SEPARATION PROCESS
Charles Newton Kimberlin, Jr., and William Judson Mattox, Baton Rouge, La., assignors to Esso Research and Engineering Company, a corporation of Delaware
Filed Feb. 7, 1956, Ser. No. 563,893
25 Claims. (Cl. 260—676)

The present invention relates to a process for separating and segregating straight chained hydrocarbons from mixtures thereof with branched chain or cyclic hydrocarbons. More particularly, the present invention relates to the separation of relatively straight chain hydrocarbons from branched chain isomers employing a class of natural or synthetic adsorbents termed, because of their crystalline patterns, molecular sieves. Still more particularly, the present invention relates to an improved desorption process whereby the hydrocarbon adsorbed on the sieve is recovered in a manner resulting in higher recovery and adsorbent efficiency than hitherto found possible.

It has been known for some time that certain zeolites, both naturally-occurring and synthetic, have the property of separating straight chain from branched chain hydrocarbon isomers, as well as from cyclic and aromatic compounds. These zeolites have innumerable pores of uniform size, and only molecules small enough to enter the pores can be adsorbed. The pores may vary in diameter from 3 or 4 Angstroms to 15 or more, but it is a property of these zeolites that any particular sieve has pores of a substantial uniform size.

The scientific and patent literature contains numerous references to the sorbing action of natural and synthetic zeolites. Among the natural zeolites having this sieve property may be mentioned chabasites. A synthetic zeolite with molecular sieve properties is described in U.S. 2,442,191. Zeolites vary somewhat in composition, but generally contain the elements of silicon, aluminum and oxygen as well as an alkali and/or an alkaline earth element, e.g. sodium and/or calcium. The naturally occurring zeolite analcite, for instance, has the empirical formula $NaAlSi_2O_6 \cdot H_2O$. Barrer (U.S. 2,306,610) taught that all or part of the sodium is replaceable by calcium to yield, on dehydration, a molecular sieve having the formula $(Ca, Na_2) Al_2Si_4O_{12} \cdot 2H_2O$. Black (U.S. 2,522,426) describes a synthetic molecular sieve zeolite having the formula $4CaO \cdot Al_2O_3 \cdot 4SiO_2$. A large number of other naturally-occurring zeolites having molecular sieve activity, i.e. the ability to adsorb a straight chain hydrocarbon and exclude the branch chain isomers due to differences in molecular size, are described in an article "Molecular Sieve Action of Solids" appearing in Quarterly Reviews, vol. III, pages 293–320 (1949), published by the Chemical Society (London).

The segregation or removal of branched chain or straight chain isomers from hydrocarbon mixtures, either for the purpose of enriching the mixture in branched chain components or for isolating and recovering straight chain isomers has become increasingly important in industry with the growing realization that the activity, potency and desired physical property of a product may depend upon the specific structure of the various possible hydrocarbons utilizable as reactants in the preparation or manufacture of the final product. Thus in the preparation of high octane fuels, the presence of paraffinic straight chain hydrocarbons makes for a lower octane fuel. On the other hand, in the manufacture of synthetic detergents such as the alkyl aryl sulfonates, a straight chain nuclear alkyl substituent confers better detergency characteristics than a branched chain isomer. Numerous other examples might be cited.

Though it has in the past been proposed to make these separations, i.e. of straight chain from branched chain hydrocarbons and from aromatics, by molecular sieves, and though excellent and selective separations have been realized, a serious problem has arisen when it has attempted to recover the adsorbed material and to regenerate the molecular sieve or zeolite. The conventional means described in the art are steaming, purging with nitrogen or methane or the like. In commercial installations it is necessary to employ a cyclic operation, i.e. and adsorption step followed by desorption and regeneration of the sieve, and thereafter another adsorption step. It has been found that regeneration or reactivation by the conventional methods of heating, evacuation, steaming and the like result in a marked decline in the adsorptive capacity of the sieves. For instance, in a process wherein a virgin naphtha fraction was treated with a synthetic molecular sieve having a pore diameter of 5 Angstroms to separate straight from branched chain constituents, and the sieves desorbed and regenerated between cycles by steam stripping followed by nitrogen flushing, the sieves decreased in capacity to 59% of fresh capacity after only three cycles. Similarly, the effect of continued treatment of the sieves with steam at the high stripping temperatures cause them to deteriorate.

It is, therefore, the principal purpose of the present invention to set forth an improved method of desorbing and stripping hydrocarbons adsorbed in the uniform pores and cavities of certain natural or synthetic zeolites, commonly called molecular sieves.

It is also a purpose of the present invention to provide desorption means which prolong substantially the life of the molecular sieve adsorbent.

It is a still further object of the present invention to desorb hydrocarbons from molecular sieves without employing unduly high temperatures and achieve the advantages of a substantially isothermal operation.

It is a still further object of the present invention to provide a means of desorbing straight chain aliphatic hydrocarbons from molecular sieves whereby improved hydrocarbon feed streams for petroleum refinery processes are obtained.

Other and futrher objects of the present invention will appear in the following more detailed description and claims.

It has now been found that these objects may be realized by employing as a desorbent and regenerating means a low boiling, preferably gaseous, olefin which is itself in turn readily desorbed, at the end of the desorbing cycle, by the higher molecular weight paraffin. Though ethylene, propylene and n-butylene may be employed, propylene is the preferred desorption agent for n-paraffins boiling within the gasoline range. In a preferred embodiment, both adsorption of the straight chain hydrocarbon from the mixture, and desorption by the olefin, are carried out in the vapor phase, and both cycles carried out at substantially the same temperature.

The relationship between the olefin desorbent, the paraffin desorbed, and the preferred desorbing temperature are shown in the table below:

| Olefin | Paraffin | Preferred temp.,° F. |
| --- | --- | --- |
| $C_2$ | $C_3$–$C_5$ | 0–100 |
| $C_3$ | $C_5$–$C_9$ | 100–300 |
| n-$C_4$ | $C_7$–$C_{12}$ | 300–450 |

In one embodiment of the invention, a mixed branched chain/straight chain material, such as virgin naphtha, boiling in the $C_6$–200° F. range may be passed through a bed of molecular sieves, having pores of about 5 A. till normal paraffins appear in the effluent. Thereupon, without changing the temperature of the molecular sieve bed, an olefin-containing gas stream, preferably containing propylene, is passed through the bed till the paraffin has been substantially displaced. Thereafter, the cycle is repeated.

The process of the present invention may be understood more clearly when read in conjunction with the drawings. FIGURE I is a flow plan representing a simple adsorption-desorption cycle and FIGURE II represents a flow plan of a process involving the present invention for preparing a feed particularly adaptable for alkylation purposes.

Turning now to FIGURE I, there is shown an adsorption column 16, provided with suitable heating means (not shown) and containing the molecular sieve adsorbent. The size of the pore diameter depends upon the molecular size of the material to be separated. It must be large enough to adsorb the straight chain but not large enough to adsorb the branched chain isomers. The adsorptive capacity and pore size of the sieve, and the structure of the hydrocarbon are related in the following manner:

| Absorbed on 4 A. and 5 A. | Absorbed on 5 A. but not 4 A. | Not adsorbed on 4 A. or 5 A. | Absorbed on 13 A. |
|---|---|---|---|
| (1) Ethane<br>(2) Ethylene<br>(3) Propylene | (1) Propane and higher n-paraffins<br>(2) Butene and higher n-olefins | (1) Iso-paraffins<br>(2) Aromatics<br>(3) All cyclics with 4 or more atoms in ring. | (1) All hydrocarbons within gasoline boiling range.<br>(2) Aromatics strongly adsorbed.<br>(3) Diolefins strongly adsorbed. |

In general, when it is desired to increase the octane rating of naphthas and hydrocarbon streams boiling in the gasoline range, sieves having a pore diameter of 5 A. are satisfactory.

A motor fuel prepared by the hydroforming of a hydrocarbon fraction, and boiling in the range of $C_6$–200° F., containing substantial amounts of aromatics as well as a minor proportion of normal paraffins is employed as feed in one embodiment of the invention. Because of the presence of the normal paraffins, the octane number of the hydroformate is relatively low, and may vary from 85 when the feed contains about 15–20% paraffins to about 95 when this is reduced to 8–10%. A feed of this type, which may contain small amounts of moisture or sulfur compounds, is introduced into the desorption system through line 2, and may be passed, if desired, through preliminary feed purification zones 8 to 10. The feed may be preheated to a temperature of 200° to 300° F. Zones 8 and 10 contain a molecular sieve material having a pore size smaller than the straight chain paraffin to be adsorbed in tower 16; it may be 4 A. or less. It has been found that the capacity of sieves to adsorb hydrocarbons is greatly reduced if water is present, even in small quantities, since it is more strongly adsorbed than most hydrocarbons. Certain sulfur compounds are also selectively adsorbed and difficult to desorb. Since most hydrocarbon streams available in a refinery contain small amounts of these impurities, the continued use of the sieves in such separation operations would necessitate periodic interruptions to desorb the contaminants and restore adsorbent capacity. With the use of the smaller type sieve, the contaminants are removed but the hydrocarbons are not adsorbed. Since the capacity of the 4 A. and smaller sieves for water is high, the volume of this adsorbent with respect to the larger sieve is small. In the drawing, two such water adsorption systems are employed in drying and regeneration cycles so as to make the hydrocarbon separation continuous. Each of the systems in turn may comprise two alternate zones, the feed being switched from 8 to 10 when zone 8 requires regeneration. The latter is accomplished by sweeping out the water with hot gases such as air. It is understood, however, that a dry feed, or one that is substantially sulfur-free, does not require this purification treatment.

The hydrocarbon feed is now passed, preferably in the vapor phase at a temperature of about 200° to 300° F. into adsorption tower 16. The adsorbent, which may be any natural or synthetic zeolite of the molecular sieve type heretofore described, may be arranged in trays, or packed on supports or be unsupported. Reaction conditions within adsorber are flow rates of 0.1–5 v./v./hr., temperatures of 175°–350° F., and pressures of atmospheric to about 400 p.s.i.g.

The substantially straight chain paraffin-free hydroformate is withdrawn from tower 16 and passed via line 17 and cooler 25 to accumulator 19, from where it may be withdrawn through line 21 for blending or for direct employment as a high octane motor fuel.

When the sieve becomes saturated with n-paraffins, as determined by conventional means such as refractive index, gravity or spectrographic analysis of the effluent, the flow of hydrocarbon feed through line 2 is halted and the desorption cycle begins. An olefin-containing gas, preferably one comprising a substantial proportion of propylene, and preheated to 200° to 250° F. is passed through line 1, dried if desired in purifiers 7 or 9 containing the same or similar sieve type as in zones 8 and 10, and passed into tower 16. Cracked refinery gases, containing, besides propylene, minor amounts of ethane and propane, may be used for this purpose. Without changing the temperature of the tower 16, the desorbing gas replaces the paraffins adsorbed on the sieves with the olefins. The paraffinic constituents of the desorbing gas are not retained by the sieve; since the zeolites have a substantially greater affinity for olefins than for paraffins of the same number of carbon atoms. The desorbed n-paraffins are withdrawn through line 18, cooled in cooler 26, and passed to accumulator-separator 20. The paraffinic gases may be withdrawn through line 24.

At the end of the desorption cycle, when no more paraffins are recovered and olefin gas appears in significant amounts in line 18, the adsorption cycle is resumed. The olefins are in turn desorbed by the n-paraffins and are withdrawn along with the unadsorbed branched chain and aromatic constituents, through line 17, cooler 25, and accumulator 19. They are readily separated from the gasoline fraction by simple flashing or distillation, and may be recycled to the desorption feed stage.

In FIGURE II there is shown an embodiment of the present invention peculiarly adapted to prepare an alkylation feed stock. By alkylation reference is had to the process wherein an isoparaffin, such as isobutane, is reacted with an olefin such as propylene, ethylene, or butylene, in the presence of a Friedel-Crafts catalyst such as $AlCl_3$, or with $H_2SO_4$ to produce a high octane motor fuel constituent.

In accordance with the embodiment shown diagrammatically in FIGURE II, an olefin-isoparaffin feed is prepared by concentration of these components from one or more hydrocarbon streams using the molecular sieve adsorbents. Though the process will be described in relation to alkylation of isobutane, other isoparaffins may be similarly reacted.

Turning to FIGURE II, a refinery stream consisting predominantly of normal and isobutane is passed via line 32 in the vapor phase to adsorption tower 34, which is packed with a molecular sieve adsorbent having a uniform pore diameter of about 5 A. Reaction conditions of temperature, pressure and the like are similar to those described hitherto in connection with tower 16 of FIGURE I. In the adsorption cycle, n-$C_4$ is retained on the sieve while i-$C_4$ passes through the tower 34, line 36 and cooler 37 and into accumulator 38. At the end of the adsorption cycle, determined as described previously, the flow of feed through line 32 is halted, and an olefinic gas stream, such as cracked refinery gas described hitherto, is admitted through line 40 and displaces the n-C$_4$ in tower 34. The latter, as well as the unadsorbed low molecular weight gaseous paraffinic constituents of the desorbing gas, are passed via line 42 and, after cooling and condensation, to separator 44. The C$_2$–C$_3$ paraffins are withdrawn overhead through line 46 while the liquefied n-butane is passed to isomerization zone 50 wherein the n-butane, in the presence of an isomerization catalyst such as AlCl$_3$ or similar type catalyst, is converted to the iso form. This is a well-known process and forms no part of the present invention.

The effluent from the isomerization zone, consisting of iso C$_4$ and unconverted n-C$_4$, may then be recycled to tower 34 via lines 52 and 32 during the adsorption cycle. The n-C$_4$ displaces the propylene adsorbed during the prior desorption stage. The desorbed olefin, together with the isobutane then is passed to accumulator 38 via line 36 and cooler 37 and is ready for alkylation in a manner known per se. By operating in the above manner, not only are feeds of the highest degree of purity obtained, but refinery economies are realized.

The process of the present invention may be further illustrated by the specific examples below.

EXAMPLE I

A fixed-bed column of 5 A. type molecular sieves was employed in the separation of normal paraffins from a 63.2 research octane number straight-run naphtha having a boiling range of 155 to 354° F. Propylene was used to desorb or displace the adsorbed n-paraffins. The entire cycle of adsorption and desorption was carried out at a constant temperature of 305° F. and at atmospheric pressure. The unadsorbed, n-paraffin-free material was obtained in 76 vol. percent yield and had a research octane number of 78. Other physical property data on this fraction indicate, in relation to other correlated hydroformer feed inspection data, that substantial improvements in hydroformate yield can be obtained by reforming the n-paraffin-free fraction as compared to the total feed.

During the 16 isothermal adsorption-desorption cycles of this separation no decrease in the adsorptive capacity of the sieves was noted. On the other hand, a separation test in which the sieves were desorbed and regenerated between cycles by steam stripping followed by nitrogen flushing at 850°–900° F. resulted in a decrease in sieve capacity to less than two-thirds of that of fresh sieves after only 3 cycles.

EXAMPLE II

It has hitherto been pointed out that it is desirable to employ a substantially dry feed to the adsorption stage. It has also been pointed out that propylene is one of the preferred desorbents. The effect of moisture in the feed, and of ethylene as the desorbent, is graphically shown in FIGURE III.

In the data shown in this figure, wherein n-heptane is separated from toluene by adsorption on a 5 A. sieve, the figure shows the adsorptive capacity of the sieves after various displacements. Ethylene (cycle 2) was not effective for desorbing n-C$_7$, and the subsequent adsorption showed a capacity of only 40% of that of the fresh adsorbent. Desorption with 99% propylene restored capacity to 86–87% of that of the fresh sieves. During eight of such cycles with undried feed there was a slight decrease in adsorptive capacity to 76%. The next 4 cycles with dry feed showed no further decline. The sieves were then removed from the adsorption column and heated for 2 hours at 850° F., whereby the capacity of the adsorbents was completely restored. In the 9 subsequent cycles the adsorbent capacity was relatively constant at about 80–88%. The adsorbent maintained a capacity of 8.6–9.2 vols. of C$_7$ adsorbed per 100 vols. of adsorbent.

EXAMPLE III

To demonstrate the superiority of propylene desorption over desorption by propane (i.e. an inert gas) under the same conditions, the folowing data are significant. A 5 A. sieve was used to separate n-paraffins from a 200° end point hydroformate fraction having an octane number of 77.0 (Research). The adsorption was carried out in a 650 cc. vapor jacketed column at 240° F.

*Table 1*

SEPARATION OF n-PARAFFINS FROM 200° F. E.P. HYDROFORMATE 5 A. SIEVES; 240° F.

| Period No. | Paraffin displ. (75 min.) | | n-Paraffin recovery, cc./100 cc. adsorbent |
|---|---|---|---|
| | Gas | Liq. rate (v./100 v./h.) | |
| 1–12 (average) | C$_3$H$_6$ | 10.2 | 6.1 |
| 2 | C$_3$H$_6$ | 10.2 | 5.9 |
| 10–12 | C$_3$H$_6$ | 10.2 | 5.9 |
| 13 | C$_3$H$_6$ | 27 | 5.8 |
| 15 | C$_3$H$_8$ | 10 | 2.0 |

In periods 1–12 the propylene used for n-paraffin displacement was fed at a rate of 10.2 liquid volumes/100 vols. sieves/hr. Fifty minutes at this rate displaced 96% of the adsorbed paraffins, or 1.5 vols. of C$_3$H$_6$/vol. of paraffin. At a higher propylene rate of 27 vols./100 vols. sieves/hr., 96% of the adsorbed paraffins was displaced in 25 min., or 1.9 vols. of C$_3$H$_6$/vol. of paraffin. This indicates a somewhat more efficient utilization of the propylene at the lower rate. However, up to about 70% displacement the efficiencies are approximately the same for the two rates.

During the twelve adsorption-desorption cycles of the hydroformate separation in which the propylene rate during desorption was 10.2 v./100 v./h., there was no indication of decreased adsorptive capacity. In cycle 2 and in cycle 12, the n-paraffin recovery was 5.9 cc./100 cc. adsorbent. This capacity compares with an over-all average of 6.1 cc. for the twelve cycles.

In cycle 15 with propane as the desorbing gas, only 2 vols. of n-heptane were recovered/100 vols. of adsorbent indicating that this hydrocarbon is not suitable for displacements of this type.

EXAMPLE IV

The octane improvement realized by employing the sieves for separating the n-paraffin, and the propylene to desorb the paraffins is shown by the following example. The outstanding advantage of carrying out the adsorption-desorption cycle at a constant temperature is also seen.

Molecular sieves having a pore diameter of 5 A. were used for the separation of n-paraffins from a 200° F. E.P. fraction of a 95 octane number hydroformate. This fraction had an F–1 octane number of 77.0 and amounted to 20 vol. percent of the total hydroformate. The adsorption-desorptions were carried out in a 600 cc. vapor jacketed column at 240° F. Desorption of the n-paraffins with propylene in 14 cycles provided sufficient material for octane number determination and analytical distillation.

OCTANE IMPROVEMENT BY MOLECULAR SIEVE ADSORPTION

| | Yield | CFR-R octane No. |
|---|---|---|
| 200° F. E.P. hydroformate (feed) | 100 | 77.0 |
| Raffinate | 75 | 86.7 |
| Adsorbate | 25 | 41 |

Blending the 200° F. iso-paraffin-aromatic fraction (raffinate) with the 200°–400° F. hydroformate would give approximately a 95% yield (based on total hydroformate) of 98 F–1 octane number composite, as compared to an octane number of 95 for the original Init.–400° F. total hydroformate. Distillation of the desorbed-n-paraffins showed approximately equal volumes of pentane, hexane and heptane.

Molecular sieve adsorptions of the 200° F. + bottoms fraction of the 95 research octane number hydroformate removed 4 vol. percent of n-paraffins. The research octane number of the cut increased from 99.9 to 103. Due to the polymer present in the 200° F. + bottoms feed to the sieve adsorption column and which was removed in the vaporizer coil, the actual increase in octane was probably somewhat greater than indicated. Blending this n-paraffin-free product with the 86.7 octane number $C_5$–200° F. cut gives an estimated 92% yield[1] of 100 octane number product. A summary of these data is shown in the following tabulation.

HYDROFORMATE TREATMENT WITH 5 A. SIEVES PROPYLENE REACTIVATION OF SIEVES

| Feed | $C_5$–200° F. fraction (20%) | 200° F. + bottoms (80%) | Est. $C_5$–400° F. |
|---|---|---|---|
| Octane number, res. cl | 77.0 | 99 | 95 |
| Temp., ° F | 240 | 305 | |
| Cycles | 9 | 1 | |
| N-paraffins separated: | | | |
| Vol. percent | 25 | 4 | 8 |
| Octane number, res. cl | 41.0 | | |
| Unabsorbed fraction: | | | |
| Vol. percent | 75 | 96 | a 92 |
| Octane number, res. cl | 86.7 | 103 | 100 | a 73% yield on basis fresh feed to the hydroformer.

The process of the present invention may be modified in many respects and still be within the scope thereof. The butenes may also be employed advantageously as desorbing agents as well as propylene, particularly, for higher molecular weight paraffins. The separations may be employed for substantially any feed containing n-paraffins, the sieve pore diameter being chosen in accordance with the molecular size. Though a fixed-bed operation has been described, the separation cycles may also be carried out by means of the so-called fluidized solids technique in fluidized beds. The process of the present invention is particularly adapted to be employed in association with various means for upgrading virgin naphthas to form high octane motor fuels. As pointed out, the process is advantageously employed in connection with a fluid or fixed bed hydroforming operation wherein naphthas are treated at elevated temperatures and pressures in the presence of a catalyst such as platinum with hydrogen under conditions to convert a substantial portion of the hydrocarbons present to aromatics. The resulting hydroformate is then enhanced in octane value by removal of n-paraffins by the sieves. The adsorbate may then be recovered in accordance with the process of the present invention and recycled to the hydroformer for further conversion.

What is claimed is:
1. In a vapor phase process for the separation of straight chain hydrocarbons from mixtures by contacting said mixture with molecular sieves in an adsorption zone whereby said straight chain hydrocarbons are selectively adsorbed, the improvement which comprises desorbing said molecular sieves with an olefin-comprising gas and recovering said straight chain hydrocarbons.

2. The process of claim 1 wherein said mixture is a naphtha fraction boiling in the gasoline range and said gas comprises propylene.

3. An improved process for separating straight chain paraffinic hydrocarbons from mixtures with other hydrocarbons which comprises passing a vaporized stream of said mixture into a molecular sieve adsorption zone, maintaining a temperature of from about 100–450° F. in said zone, withdrawing unadsorbed non-straight chain hydrocarbons from said zone while adsorbing straight chain paraffins, thereafter passing a propylene-comprising gas into said zone whereby normal paraffins are desorbed and said propylene adsorbed, maintaining substantially similar temperatures during said adsorption and desorption stages, withdrawing said desorbed normal hydrocarbons, and thereafter again passing said vaporized mixture into said zone.

4. The process of claim 3 wherein said mixture is a naphtha boiling in the range of $C_6$–200° F., and said temperature about 175–350° F.

5. The process of claim 3 wherein said feed mixture and said desorption gases are freed from water prior to passage to said zone.

6. The process of claim 3 wherein said gas is a propylene-comprising cracked refinery gas.

7. The process of claim 3 wherein said sieves have a pore diameter of about 5 angstroms.

8. An improved process for upgrading naphthas produced by catalytic hydroforming which comprises passing vaporized hydroformate into a molecular sieve adsorption zone, maintaining a temperature in said zone in the range of from about 100–450° F., adsorbing straight chain paraffins from said hydroformate, withdrawing an upgraded higher octane naphtha depleted in straight chain paraffins from said zone, desorbing said straight chain paraffins from said sieves in said zone with a propylene-containing gas, recovering said straight chain paraffins, and thereafter passing further quantities of said vaporized hydroformate to said zone.

9. The process of claim 8 wherein said desorbed paraffins are passed to a hydroforming zone for further conversion to high octane gasoline.

10. The process of claim 8 wherein said adsorption and desorption stages are carried out at substantially the same temperature level.

11. An improved process for preparation of an alkylation feed stock which comprises passing a vaporized mixture of normal and isoparaffins into a molecular sieve adsorption zone, withdrawing an isoparaffinic stream, desorbing normal paraffins with an olefin-comprising gas, passing withdrawn desorbed normal paraffins to an isomerization zone wherein they are converted to isoparaffins, passing said isoparaffins and unisomerized normal paraffins to said adsorption zone, desorbing said olefins with said normal paraffins, and passing said desorbed olefins and said isoparaffins to an alkylation zone.

12. The process of claim 11 wherein said first named feed is a refinery stream consisting predominantly of normal and isobutane, and said olefin-comprising gas is a cracked refinery gas.

13. In a process for the separation of straight chain hydrocarbons from mixtures by contacting said mixtures with molecular sieves in an adsorption zone whereby said straight chain hydrocarbons are selectively adsorbed, the improvement which comprises desorbing said molecular sieves with a gas comprising n-butylene and recovering said straight chain hydrocarbons.

14. A method of desorbing straight chain hydrocarbons from a selective zeolitic adsorbent which contains straight chain hydrocarbons adsorbed therein to the substantial exclusion of non-straight chain hydrocarbons which comprises contacting said zeolitic adsorbent with a gaseous olefinc hydrocarbon containing at least 3 carbon atoms per molecule at an elevated temperature sufficiently high to effect desorption of said straight chain hydrocarbons from said adsorbent.

15. A method of desorbing straight chain hydrocarbons from a selective zeolitic adsorbent which contains straight chain hydrocarbons adsorbed therein to the substantial exclusion of non-straight chain hydrocarbons which com-

[1] Based on 95 O.N. hydroformate or 73% yield on basis of fresh feed to the hydroformer.

prises contacting said zeolitic adsorbent with a gaseous olefinic hydrocarbon containing at least 3 carbon atoms per molecule and having a boiling point as compared to the straihgt chain hydrocarbons contained adsorbed with said selective adsorbent so as to be readily separable therefrom by fractional distillation, at an elevated temperature sufficiently high so as to effect desorption of said adsorbed straight chain hydrocarbons from said selective adsorbent.

16. A method of desorbing straight chain hydrocarbons from a selective zeolitic adsorbent containing straight chain hydrocarbons adsorbed therein to the substantial exclusion of non-straight chain hydrocarbons which comprise contacting said zeolitic adsorbent with a gaseous olefinic hydrocarbon containing at least 3 carbon atoms per molecule at an elevated temperature sufficiently high so as to effect substantially complete desorption of said straight chain hydrocarbons from said adsorbent.

17. A method of desorbing straight chain hydrocarbons from a selective zeolitic adsorbent containing straight chain hydrocarbons adsorbed therein to the substantial exclusion of non₅straight chain hydrocarbons which comprises contacting said zeolitic adsorbent with a gaseous olefinic straight chain hydrocarbon containing at least 3 carbon atoms per molecule at a temperature sufficiently high to effect desorption of said straight chain hydrocarbons from said adsorbent.

18. A method of desorbing straight chain hydrocarbons from a selective zeolitic adsorbent which contains straight chain hydrocarbons in the molecular weight range $C_5$–$C_{10}$ adsorbed therein which comprises contacting said zeolitic adsorbent with a straight chain olefinic hydrocarbon containing at least 3 carbon atoms per molecule at a temperature sufficiently high to effect desorption of the straight chain hydrocarbons from said adsorbent.

19. A method of desorbing straight chain hydrocarbons from a selective zeolitic adsorbent containing straight chain hydrocarbons adsorbed therein which comprises contacting said zeolitic adsorbent with a gaseous olefinic hydrocarbon selected from the group consisting of $C_3$–$C_5$, inclusive, hydrocarbons at a temperature sufficiently high so as to effect desorption of the straight chain hydrocarbons from said adsorbent.

20. A combination hydrocarbon treating operation which comprises subjecting a hydrocarbon fraction in the naphtha boiling range and containing straight chain hydrocarbons and non-straight chain hydrocarbons to catalytic reforming with the resulting production of a catalytic reformate having an increased proportion of non-straight chain hydrocarbons, contacting said catalytic reformate with a selective zeolitic adsorbent which selectively adsorbs straight chain hydrocarbons to the substantial exclusion of non-straight chain hydrocarbons to adsorb straight chain hydrocarbons therefrom with the resulting production of a treated reformate having a reduced proportion of straight chain hydrocarbons therein, and contacting said zeolitic adsorbent now containing straight chain hydrocarbons adsorbed therein with a gaseous olefinic hydrocarbon containing at least 3 carbon atoms per molecule at a temperature sufficiently high so as to effect the desorption of said straight chain hydrocarbons from said adsorbent.

21. A combination process for treating a hydrocarbon fraction in the naphtha boiling range containing straight chain hydrocarbons and non-straight chain hydrocarbons which comprises catalytically reforming said hydrocarbon fraction with the resulting production of a catalytic reformate having an increased proportion of non-straight chain hydrocarbons, contacting said catalytic reformate with a selective zeolitic adsorbent which selectively adsorbs straight chain hydrocarbons to the substantial exclusion of non-straight chain hydrocarbons to effect adsorption of said straight chain hydrocarbons therefrom and the resulting production of a treated reformate having a reduced proportion of straight chain hydrocarbons relative to said catalytic reformate, and contacting the zeolitic adsorbent, now containing straight chain hydrocarbons adsorbed therein, with a gaseous olefinic hydrocarbon containing at least 3 carbon atoms per molecule at a temperature sufficiently high to effect substantially complete desorption of the adsorbed straight chain hydrocarbons, said gaseous hydrocarbon having a boiling point relative to the adsorbed straight chain hydrocarbons contained within said adsorbent so as to be readily separable therefrom by fractional distillation.

22. A method in accordance with claim 21 wherein said gaseous hydrocarbon is a hydrocarbon having a molecular weight in the range $C_3$–$C_5$.

23. A method in accordance with claim 15 wherein said gaseous hydrocarbon is a $C_4$ hydrocarbon.

24. A method of desorbing straight chain hydrocarbons from a selective zeolitic adsorbent containing straight chain hydrocarbons adsorbed therein which comprises contacting said zeolitic adsorbent with a gaseous olefinic straight chain hydrocarbon selected from the group consisting of straight chain olefinic hydrocarbons having from 3 to 5, inclusive, carbon atoms per molecule at an elevated temperature sufficient to effect substantially complete desorption of the straight chain hydrocarbons adsorbed in said adsorbent.

25. A method of upgrading $C_3$ and $C_4$ hydrocarbon streams which comprises contacting a gaseous $C_3$ hydrocarbon stream containing propane and propylene with an alumino-silicate solid selective adsorbent which selectively adsorbs straight chain hydrocarbons to the substantial exclusion of non-straight chain hydrocarbons and which selectively adsorbs propylene over propane to adsorb propylene from said $C_3$ stream, desorbing the adsorbed propylene from said adsorbent by contact with a gaseous $C_4$ hydrocarbon stream containing n-butane and isobutane under conditions such that n-butane in said $C_4$ petroleum refinery stream displaces the previously adsorbed propylene and is adsorbed by said selective adsorbent and passing the resulting gaseous desorption effluent comprising isobutane and propylene to an alkylation reaction zone for the manufacture of the corresponding propylene-isobutane alkylate.

References Cited in the file of this patent

UNITED STATES PATENTS

| | | |
|---|---|---|
| 2,306,610 | Maling | Dec. 29, 1942 |
| 2,442,191 | Black | May 25, 1948 |
| 2,470,339 | Claussen | May 17, 1949 |
| 2,487,805 | Hermanson | Nov. 15, 1949 |
| 2,522,426 | Black | Sept. 12, 1950 |
| 2,818,455 | Ballard et al. | Dec. 31, 1957 |

OTHER REFERENCES

Hibshman: Ind. and Eng. Chem., 42, No. 7 (1950), pages 1310–1314.